Patented Apr. 11, 1950

2,503,254

UNITED STATES PATENT OFFICE 2,503,254

PROCESS OF PREPARING 1-AMINO-4-BROMOANTHRAQUINONE-2-SULFONIC ACID

Werner Freudenberg, Cranford, N. J., assignor to General Aniline & Film Corporation, New York, N. Y., a corporation of Delaware No Drawing. Application October 29, 1948, Serial No. 57,402

2 Claims. (Cl. 260—371)

This invention relates to an improved process for the preparation of 1-amino-4-bromoanthraquinone-2-sulfonic acid, a valuable intermediate in the manufacture of certain dyestuffs of the amine anthraquinone series.

The preparation of 1-amino-4-bromoanthraquinone-2-sulfonic acid is customarily carried out by the bromination of 1-aminoanthraquinone-2-sulfonic acid contained in aqueous suspension. A by-product of this reaction is the dibrom compound, 1-amino-2,4-dibromoanthraquinone. The art has sought to diminish the occurrence of the dibrom compound with concurrent increase in the yield of the desired monobrom compound.

The success of the bromination depends upon the presence in the aqueous suspension of the proper particle size for the 1-aminoanthraquinone-2-sulfonic acid. Whereas large particles lead to incomplete bromination, particles which are too small, and particularly a solution of the amine acid, produce over-bromination. To the end therefore of attaining the proper particle size for the bromination, the art has heretofore prepared the suspension by salting out the 1-aminoanthraquinone-2-sulfonic acid from concentrated aqueous solution by the addition thereto of concentrated aqueous salt solution and, following completion of the salting-out operation, agitating the mixture for a lengthy period, as long as 12 hours, whereby to condition it to a suspension for optimum bromination. By the agitation, a gentle attrition is set up in the mixture causing a diminution in size of the larger particles with consequent greater uniformity of particle size in the suspension. For years, however, the process has given unsatisfactory yields of the 1-amino-4-bromoanthraquinone-2-sulfonic acid even though the greatest case was exercised in following and controlling the process.

I have now found that this bromination process can be modified to give consistently higher yields of 1-amino-4-bromoanthraquinone - 2 - sulfonic acid with substantially lower yields of the by-product dibrom compound than obtained heretofore and to effect a further economy in the form of a substantially shorter agitation period for forming the finished suspension of the starting 1-aminoanthraquinone-2-sulfonic acid from the aqueous mixture derived from the salting-out operation.

These improvements in the process are obtained in accordance with my invention by employing a reverse salting-out procedure for the preparation of the suspension. This reverse salting-out is accomplished by adding, contrary to the usual order, the concentrated aqueous solution of the 1-aminoanthraquinone-2-sulfonic acid to the concentrated aqueous solution of the salt, which suitably is sodium chloride, although other salts commonly used in salting-out operations, such as sodium sulfate and potassium sulfate, can also be employed. As is customary in salting-out operations, the addition is made gradually and with stirring. It is not necessary to subject the mixture from the salting-out operation to agitation for the prolonged periods required in the prior art process, a finished suspension being obtained after a relatively short period of agitation, for example, in 1 to 2 hours, containing the 1-aminoanthraquinone-2-sulfonic acid in the form of small particles of generally uniform size and well dispersed.

The difference between the two salting-out procedures can actually be seen not only by microscopic examination but also visually by actual color of the precipitated mass. Whereas the suspension salted out according to the conventional way is orange and changes with stirring to a bronze color, suspensions prepared by reverse salting-out are pink and do not undergo a color change when stirred even for prolonged periods of time.

The remainder of the process can be carried out as in the prior art, employing the usual brominating reagents and the preferred reaction temperatures of 5 to 10° C., although the reaction may be operated at higher temperatures up to about 20° C.

The process of the invention is further illustrated by the following specific example to which, however, it is not intended that it be limited. Parts are by weight unless otherwise indicated.

Example 75 parts of 1-aminoanthraquinone-2-sulfonic acid is dissolved in 750 parts of water, 20 parts of a diatomaceous earth is added as a filtering aid and the solution filtered at 60° C. To the filtrate is added 40 parts of 78% sulfuric acid, 18 parts of sodium sulfate and sufficient water to make up to 1750 parts by volume. This solution is cooled to 10° C. and added, over a period of one-half hour, with stirring, to a cold solution of 153 parts of sodium chloride in 450 parts of water. The mixture therefrom is stirred for 1 hour, forming a suspension in which the particles of the 1-aminoanthraquinone-2-sulfonic acid are of generally uniform size and well dispersed. To the suspension thus obtained is gradually added with stirring, 20 parts of bromine dissolved in 100 parts of a 1:4 mixture of glacial acetic acid and concentrated hydrochloric acid. The bromination is conducted at a temperature of 5 to 10° C. and is completed within 8 hours. Completion of the bromination is effected by the addition of 70 parts of sodium hypochlorite in the form of a 14% aqueous solution. The 1-amino-4-bromoanthraquinone-2-sulfonic acid is isolated in the usual manner. The yield of the monobrom compound is 85%, and that of the dibrom compound, 4%.

The prior art bromination process carried out under identical conditions produces varying yields of the 1-amino-4-bromoanthraquinone-2-sulfonic acid ranging from about 70 to 83% but generally averaging about 75%. By the improved process of my invention, as has been repeatedly demonstrated in practice, a sustained high yield, about 85%, in the desired monobrom compound is obtained along with a substantially lower yield of dibrom compound as by-product, namely, about 4–5%, the latter in contrast to the 6% heretofore usually obtained in the process.

Whereas in the foregoing example there was added to the solution of the 1-aminoanthraquinone-2-sulfonic acid a quantity of sulfuric acid and of sodium sulfate, these additions are not necessary to the attainment of an improved particle size of the amine acid in the suspension. Like results can be obtained without these additions, wherein only the concentrated aqueous solution of the 1-aminoanthraquinone-2-sulfonic acid is stirred into the concentrated water solution of the salt. While the presence of the sulfuric acid and the sodium sulfate in the salting-out operation is recommended because of the additional salting-out effect due to the salt thereby added, the essential action of these two substances lies in their use, as is well known, as components of the brominating reagent.

Since the invention may be practiced without departing from the spirit or scope thereof, it is not intended that it be limited except as is required by the prior art and the appended claims.

I claim:

1. A process for the preparation of 1-amino-4-bromoanthraquinone-2-sulfonic acid, which comprises brominating 1-aminoanthraquinone-2-sulfonic acid contained in an aqueous suspension which has been prepared by a reverse salting-out procedure wherein the concentrated aqueous solution of the 1-aminoanthraquinone-2-sulfonic acid is added to the concentrated aqueous solution of the salt and the resulting mixture is agitated until the particles of the 1-aminoanthraquinone-2-sulfonic acid are well dispersed therein.

2. The process as defined in claim 1, wherein the salt solution is a concentrated aqueous solution of sodium chloride.

WERNER FREUDENBERG.

No references cited.